No. 890,409. PATENTED JUNE 9, 1908.
W. H. COX.
PRESS FOR THE MOLDING OF BICYCLE AND OTHER TIRES.
APPLICATION FILED JULY 6, 1907.

Witnesses
Samuel Payne
A. J. Trigg

Inventor
William H. Cox
by
Attorneys

UNITED STATES PATENT OFFICE.

WILLIAM HENRY COX, OF ECCLES, ENGLAND.

PRESS FOR THE MOLDING OF BICYCLE AND OTHER TIRES.

No. 890,409.      Specification of Letters Patent.      Patented June 9, 1908.

Application filed July 6, 1907. Serial No. 382,523.

*To all whom it may concern:*

Be it known that I, WILLIAM HENRY COX, a subject of His Majesty the King of Great Britain and Ireland, residing at Priory Bank, Wellington Road, Eccles, in the county of Lancaster, England, have invented certain new and useful Improvements in Presses for the Molding of Bicycle and other Tires, of which the following is a specification, reference being had therein to the accompanying drawings.

My invention relates to improvements in presses for the molding of bicycle and other tires before vulcanization, and has for its object the construction of a circular or cylindrical press the force of which acting in a radial direction acts on an elastic and pliable cushion, which, following the line of least resistance, insures an even pressure over all parts of the tire, to press firmly together the materials of which the tire is made; and at the same times impresses upon the rubber compound with which the tire is covered any shape or design which may be engraved on the surface of the mold.

Figure 1:
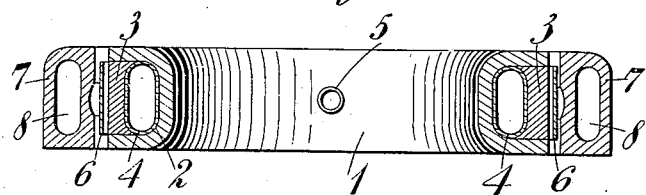
Figure 2:
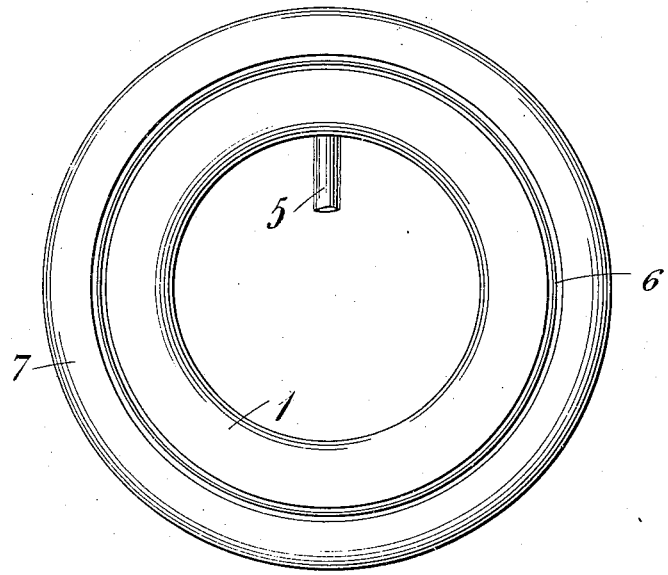

In order that my invention may be clearly understood, reference may be had to the accompanying sheet of drawings, in which Figure 1 is a sectional elevation of the improved means, and Fig. 2 is an external plan view.

Similar letters of reference are used to indicate like parts in both views.

A press according to my invention comprises a hollow annulus or ring of metal 1, having a channel 2 round its periphery so as to form a chamber to receive the cushion 3 which consists of a thick india-rubber band, free to expand and contract in the said channel.

Between the cushion and the bottom of the groove I insert an endless india-rubber tube 4 which, when inflated through the pipe 5 by hydraulic pressure or compressed air, forces the cushion 3 outwards, and causes the same to come in contact with the tire 6 which is placed in position around it, and thereby presses the said tire against the face of the mold 7. This mold, which consists of a hollow metal cylinder having the shape and design to be imparted to the tire engraved on its inside circumference, is provided with a steam space 8 for the purpose of keeping the mold warm, so that a quicker and sharper impression of the design is imparted to the plastic india-rubber surface with which the tire is covered, and the better amalgamation is secured of the various substances of which the tire is composed.

The operation of the press is as follows:— The annulus or ring 1, containing the cushion 3 and endless tube 4, is made to descend below the level of the bottom of the mold 7 by any mechanical or other contrivance, so as to allow the tire to be placed in position within the mold. The hollow annulus or ring 1 is then raised again into its former position, and the pressure, being admitted into the endless tube 4 through the pipe 5, inflates the said tube and forces the cushion 3 outwards in a radial direction until it comes in contact with the tire 6 and presses it firmly against the mold 7. The tire having been under pressure a few minutes, the pressure is removed, when the elasticity of the india-rubber cushion causes it to recover its normal dimensions and allows the cylinder 1 to be again lowered for the removal of the now molded tire. The tire is then cured or vulcanized "openly" in the usual way except that no "wrapping" is required, thereby saving considerably in labor and material.

What I claim is:—

In a tire press, an annulus or ring provided with a peripheral annular chamber open at the outer side, an annular inflatable tube within said chamber, a pipe carried by the annulus and communicating with said inflatable tube whereby the same may be inflated, an annular cushion within said chamber surrounding the inflatable tube and engaging the same, and a hollow annular mold adapted to encircle the annulus, substantially as described.

In testimony whereof I affix my signature in the presence of two witnesses.

WILLIAM HENRY COX.

Witnesses:
    J. R. LUCIEN,
    F. MITCHELL.